United States Patent [19]

Turner et al.

[11] 4,346,613

[45] Aug. 31, 1982

[54] LIQUID SAMPLE COLLECTOR DEVICE

[76] Inventors: Robert C. Turner, May Cottage, Great Milton, Oxfordshire, OX9 7NT; Rury R. Holman, 42 Meadow Close, Farmoor, Oxfordshire, OX2 9NZ, both of England

[21] Appl. No.: 208,025

[22] Filed: Nov. 18, 1980

[30] Foreign Application Priority Data

Nov. 19, 1979 [GB] United Kingdom ................. 7939887

[51] Int. Cl.³ ................................................ G01N 1/12

[52] U.S. Cl. ................................ 73/864.51; 128/760; 422/102

[58] Field of Search ........... 73/864.91, 864.51, 864.12; 422/102, 103

[56] References Cited

U.S. PATENT DOCUMENTS

| | | | |
|---|---|---|---|
| 3,252,768 | 5/1966 | Edmond | 422/103 |
| 3,933,440 | 1/1976 | Woolley | 422/102 |
| 4,314,570 | 2/1982 | Sarstedt | 422/102 |

FOREIGN PATENT DOCUMENTS

| | | | |
|---|---|---|---|
| 2533052 | 1/1977 | Fed. Rep. of Germany | 422/102 |
| 596857 | 3/1978 | U.S.S.R. | 422/102 |

OTHER PUBLICATIONS

B-D, Unopette, (A leaflet published by Beckton, Dickenson UK Ltd. #29-1273-1-23-38), 12/78, 4 pages.

*Primary Examiner*—S. Clement Swisher
*Attorney, Agent, or Firm*—Cushman, Darby & Cushman

[57] ABSTRACT

A collector device for collecting, metering and holding a small sample of liquid, e.g. a drop of blood taken from a finger prick, comprises a vessel provided with an opening closed by a plug, and a screwthreaded cap having a protruding spigot which, when the cap is screwed fully onto the vessel, enters the opening and pushes the sliding plug down into the interior of the vessel. The plug is formed at its outer end with an outwardly facing recess, e.g. part-spherical, and the spigot is formed at its end which enters the opening with a tapering conical formation adapted to enter the recess. In use, with the cap removed the recess is filled with a quantity of liquid, the cap is then partly replaced to cause the spigot to abut the end of the plug so that its conical formation enters the recess and displaces excess liquid therefrom, trapping a metered sample of liquid of predetermined volume, less than the volume of the recess, in the space defined between the abutted ends of the plug and spigot. The cap is then screwed fully home causing the spigot to push the plug down into the vessel, thus transferring the metered liquid sample into the vessel whose opening is now closed by the spigot. The device enables a metered quantity of blood to be collected and transferred into the closed vessel for subsequent analysis, without contamination of the exterior of the device by the blood, and without the use of delicate metering devices such as capillary tubes to meter the blood sample. A latch connection may be provided between the cap and a removable lid of the collection vessel whereby when the cap is unscrewed it slowly withdraws the lid and opens the vessel.

9 Claims, 7 Drawing Figures

LIQUID SAMPLE COLLECTOR DEVICE

This invention relates to a collector device for receiving, metering and holding a small quantity of liquid.

The invention is particularly although not exclusively applicable to the collection of samples of human blood drawn directly from patients and required for subsequent laboratory analysis or investigation. For example, a sample of capillary blood may be taken from a drop of blood obtained by pricking a patient's finger.

It is standard practice in clinical work to transfer blood from such a drop into a fine capillary tube, which when filled thus contains a metered sample of fresh blood whose quantity is determined by the length and bore of the capillary tube. The blood sample is then transferred into a collection vessel containing a diluent which prevents clotting and deterioration of the blood sample, and the vessel can be closed and despatched to the laboratory for analysis.

One object of the present invention is to provide a collector device which enables a sample of blood from such a blood drop to be transferred in a metered quantity into a collection vessel forming part of the device, without the need for using a capillary tube to meter the sample. Such capillary tubes are inherently fragile and require careful and delicate handling, and can be difficult to empty completely, and the avoidance of their use will greatly facilitate the transfer of the blood sample from the patient's finger into the diluent-containing collection vessel.

The invention may however be used for the collection of metered samples of any liquid which is required to be provided in small quantities for analysis or testing, for example samples of microbial cultures.

According to the present invention, a collector device for receiving, metering and holding a sample of liquid of predetermined small volume, comprises a collection vessel having an aperture leading into its interior, a plug which is a push-fit in the aperture and closes the vessel when inserted in the aperture prior to use of the device, the plug being capable of being pushed slidably through the aperture to enter the interior of the vessel, and a co-operating spigot member capable of being inserted into the aperture as a close fit therein, the opposed ends of the plug and spigot member being formed with co-operating formations shaped to define between them, when the said ends of the spigot and plug are abutted, a space of predetermined volume by which in use a sample of the liquid can be metered and temporarily trapped therein, whereby in use the spigot member can be advanced inwardly through the aperture in abutment with the plug to push the plug ahead of it and displace the plug from the aperture into the interior of the vessel so as to transfer the trapped metered liquid sample into the interior of the vessel, the spigot member when so advanced fitting closely within the aperture so as to close the vessel.

The spigot member may for example be carried by a cap having a screwthread which fits a cooperating screwthread on the vessel, whereby the cap can be screwed down on to the vessel to advance the spigot through the throat and displace the plug into the interior of the vessel.

The cooperating ends of the plug and spigot may be formed in various ways to define the space of predetermined volume between them on abutment, but in a preferred arrangement the opposed ends of the plug and spigot have cooperating concave and convex formations adapted, when the opposed ends are abutted together, to define between them a closed space of predetermined volume less than the volume of the concave formation whereby, when the opposed ends are brought together with the concave formation filled with liquid, excess liquid will be displaced from the concave formation by the convex formation leaving a metered volume of the liquid trapped in the closed space between the abutted spigot and plug. For example, the outer end of the plug may be formed with an outwardly-facing cup-shaped recess, and the cooperating end of the spigot may include an exially-projecting portion, e.g. of conical or other tapering form, which enters the recess in the plug to displace excess liquid therefrom as the spigot moves into abutment with the plug. The plug and the spigot end may have circumferential shoulders respectively surrounding the recess and projecting portion, which shoulders form the abutting surfaces of the plug and spigot.

With such an arrangement, with the spigot removed an excess volume of the liquid being sampled, e.g. blood can be introduced into the recess in the plug to fill the recess. The spigot will then be introduced into the aperture of the vessel and as it approaches the plug its projecting portion will enter the recess and displace excess sample liquid therefrom until the spigot abuts the plug, leaving the space defined between their ends filled with the predetermined volume of sample liquid. When the spigot is then pushed through the throat to displace the plug the liquid sample of predetermined metered volume will thereby be transferred into the interior of the vessel, which may already contain a diluent liquid.

It would however also be possible to form the recess in the end of the spigot, and the projecting portion on the outer end of the plug. In that case, in use the excess quantity of sample liquid would be placed in the recess, the spigot being held with the recess facing upwards, and the inverted bottle would then be applied to the spigot.

The invention may be carried into practice in various ways, but one specific embodiment thereof will now be described by way of example only and with reference to the accompanying drawings, in which.

Figure 1:
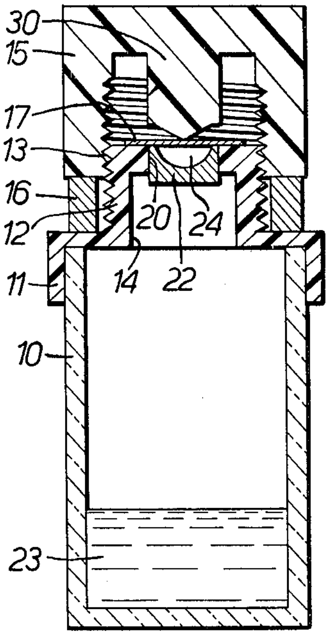
FIG. 1 is a sectional elevation of a liquid sample collector, shown prior to use with its cap in its raised position.
Figure 2:
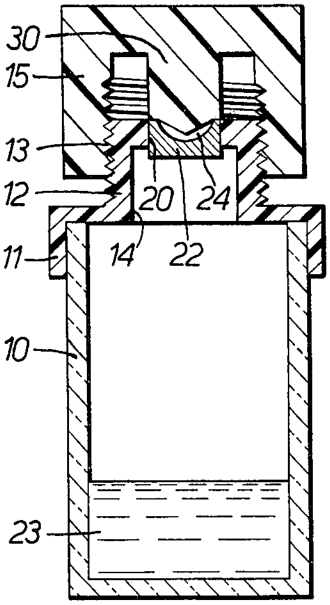
FIG. 2 shows the device of FIG. 1 with the cap partly screwed down and in abutment with a plug in the container throat.
Figure 4:
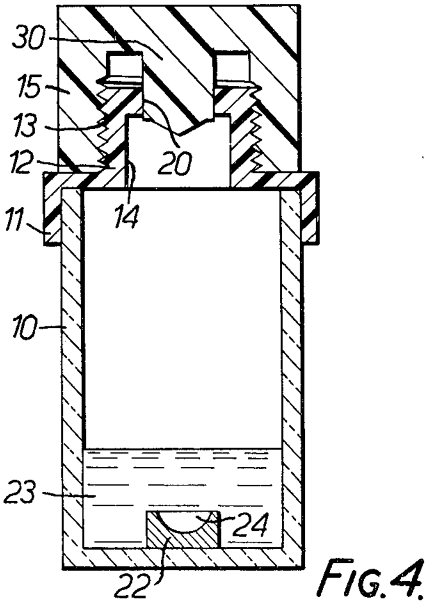
FIG. 4 is a view similar to FIG. 2 but with the cap screwed fully down and the plug displaced into the vessel.
Figure 5:
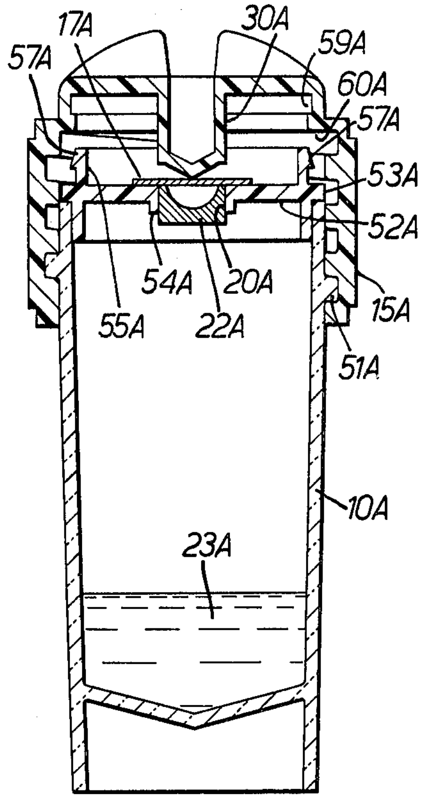
Figure 6:
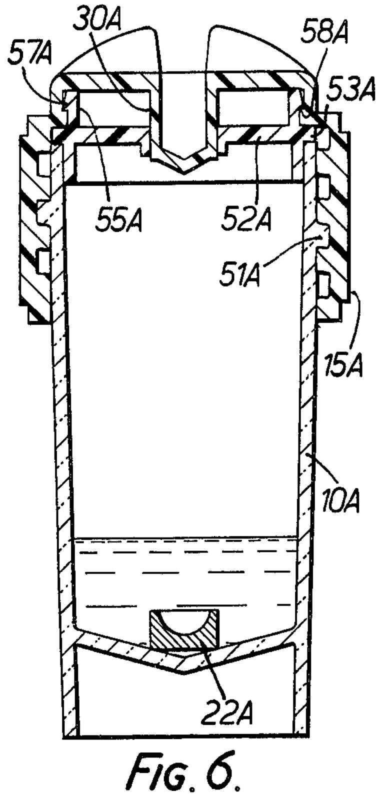
Figure 7:
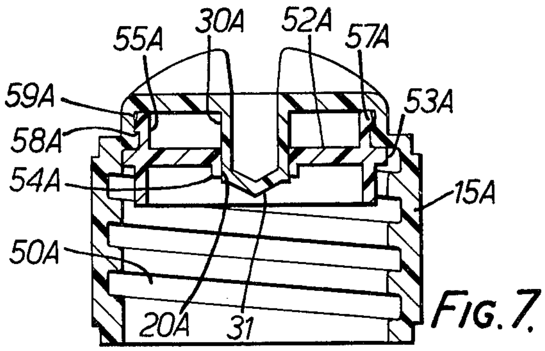

FIGS. 5 and 6 are views similar to FIGS. 1 and 4 respectively of a modified embodiment of the invention in which the cap is screwed onto an external screwthread on the main body of the collection vessel, and FIG. 7 is a sectional view of the interengaged cap and vessel closure insert of the embodiment of FIGS. 5 and 6, shown detached from the main body of the vessel.

In the embodiment shown in FIGS. 1–4 the invention is applied to a collector device for receiving and holding a small metered quantity of sample liquid, for example blood obtained from a patient. The device comprises a collection vessel 10 whose top 11, shown in this case as a separate component pushfitted onto the upper rim of the vessel, provides a neck 12 having an external screwthread 13 and a coaxial cylindrical bore 14. The top portion 11 could however be integral with or bonded to the vessel 10, which is made of glass, rigid or semi-rigid plastics material or any other suitable material. A cap 15 with a co-operating internal screwthread can be screwed onto the neck 12 and in its fully-screwed-down position shown in FIG. 4 its lower edge will abut against a co-operating shoulder on the top member 11. However, the cap can be prevented from being screwed down beyond a raised position, shown in FIG. 1, by a removable spacer washer 16, and/or by a removable spacer disc 17 positioned inside the cap 15. Instead of the disc 17, a cup-shaped or tubular spacer member could be employed resting on the neck 12 with its wall extending up towards the top of the cap.

The neck 12 of the top 11 of the collection vessel is provided with an inturned circumferential flange at the upper end of its bore 14, the flange defining a cylindrical throat 20 leading into the interior of the vessel 10 and having a mouth at its outer end. A small cylindrical plug 22 is located as a push-fit in the throat 20 so as to close the vessel 10 and retain therein a measured quantity of diluent liquid 23. The plug has an open-topped upwardly-facing recess 24 formed in its upper end, the recess 24 being of smoothly-curved form, e.g. part-spherical, and of depth such that it is slightly less than a hemisphere. The recess 24 is surrounded by an annular shoulder 25 (FIG. 3) forming the circumferential margin of the top of the plug. The plug can be so positioned in the throat 20 that its marginal shoulder 25 is flush with the top of the neck 12.

Figure 3:
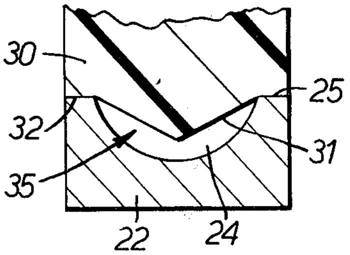
FIG. 3 is a detailed view of the abutted end of the cap spigot and the plug.

The cap 15 is formed with a central coaxial cylindrical spigot 30 which is formed at its free end with a tapering, e.g. conical, forwardly-projecting portion 31, surrounded by an annular shoulder 32. The diameter of the spigot 30 is such that it can enter the throat 20 of the neck 12 as a close sliding fit, pushing the plug 22 downwardly, when the cap is screwed down beyond its raised position of FIG. 1. The base diameter of the tapering portion 31 of the spigot matches exactly that of the mouth of the recess 24 in the plug but its axial height is less than the depth of the recess 24. The sides of both the recess 24 in the plug 22 and the projecting tapered portion 31 of the spigot 30 are reproducibly formed, e.g. by moulding, so that when the shoulders 25 and 32 are abutted coaxially as shown in FIG. 3 by the depression of the spigot 30 on screwing down of the cap 15, the space 35 so defined between the spigot and the plug has a predetermined (and repeatedly reproducible) volume corresponding to the metering volume required for the blood or other liquid sample to be collected.

The use of the device shown in FIGS. 1 to 4 will now be described in relation to the collection of a metered sample of capillary blood from a blood drop formed by pricking a patient's finger. The device is supplied in the condition shown in FIG. 1, and to bring it into use the cap is first unscrewed and the spacer washer 16 and/or the disc 17 is/are removed. A quantity of blood from the newly-drawn blood spot is the introduced into the recess 24 in the plug 22 so as to fill the recess completely. This can be done most conveniently by simply applying the patient's finger to the top of the plug so as to transfer the blood into the recess, although if preferred a transfer device such as a liquid dropper could be used. With the vessel 10 held vertical the cap 15 is then replaced and screwed down on the neck 12. As the spigot 30 is coaxial with the screwthreads and hence with the throat 20 and recess 24, the descent of the spigot will cause its tapering projecting portion 31 to enter the recess 24 and displace excess blood from the recess until the shoulders 25 and 32 abut with a mating fit. This traps a metered quantity of the blood in the space 35 of predetermined volume, less than the volume of the recess 24, between the abutted spigot 30 and plug 22. The near-hemispherical shape of the recess 24 reduces any risk of air pockets or bubbles in the liquid initially filling the recess, which might remain in the closed space 35. The device is now in the condition shown in FIG. 2.

The cap 15 is now screwed down further to cause the spigot 30 to push the plug 22 down along the throat 20 as the spigot 30 enters the throat as a close fit therein. Eventually the plug 22 will be pushed out of the throat 20 and will fall into the interior of the vessel 10, and the trapped blood sample, of predetermined known volume, will be released within the vessel. At this stage the spigot self-seals the throat 20 in place of the plug 22, thus retaining the liquid in the container and preventing any excess blood which was displaced from the recess 24 by the protruding end of the spigot from entering the vessel via its throat.

The plug 22 is preferably made of a material of greater density than the diluent 23, so that it will sink readily in the diluent allowing the blood contents of the recess 24 to be dispersed in the diluent. This dispersal can be aided by shaking the vessel 10 manually, which also applies the diluent to the end of the spigot in the throat 20, washing away any part of the blood sample which remains on the spigot.

With the cap 15 fully screwed on in the position shown in FIG. 4, the collector device can be sent to the laboratory for processing, or to storage. Subsequent analysis of the blood sample in the diluent can be performed after the vessel has been opened by removing the top portion 11 and cap 15 as a whole where the top portion 11 is a separate component, or by some other method of direct entry to the vessel 10, e.g. by cutting off the base or by piercing with a sampling needle, if the top 11 is integral with or bonded to the vessel 10. The container 10 may be of such a design as to fit directly into currently-available auto-analysers or other assaying equipment, without need for the transfer of the liquid contents from the container.

The application of the cap 15 to the threaded neck after a blood sample has been transferred into the recess 24 ensures that the outer end of the neck, which may be contaminated with blood, will be enclosed by the cap and there is little chance of inadvertent contamination of the exterior of the closed collector device or of the transfer of contamination to personnel handling the closed device.

In order to protect the tip of the projecting portion 31 of the spigot 30 from damage in the event of the cap being screwed down too hard whilst the disc 17 is in position in the cap, the centre of the disc may be formed with a hole or depression, so that the pointed tip will not contact it. If a cup-shaped spacer is employed instead of the disc, its base may be similarly apertured or depressed.

FIGS. 5 to 7 show a second embodiment of the invention in which the collection vessel has a main body portion 10A of circular section and a cap 15A which is of larger diameter than the cap 15 and has an internal screwthread 50A. In use the cap 15A is screwed onto a screwthread 51A which is formed on the exterior of the cylindrical upper part of the main body portion 10A. The lower part of the main body portion 10A has a slight taper. The top of the collection vessel comprises a circular closure insert 52A which is a tight push fit in the upper end of the main body portion 10A and has a locating flange 53A which overlies the edge of the wall of the body portion 10A and limits the extent to which the closure insert can be pushed into the main body portion, as indicated in FIGS. 5 and 6. The cap 15A carries an integral spigot 30A similar to the spigot 30, which co-operates with a plug 22A similar to the plug 30 in the same manner as described above in relation to the spigot 30 and plug 22 of FIGS. 1 to 4. However the closure insert 52A is not formed with a protruding neck, but has a central circular hole 20A defined by a flange 54A, in which hole the plug 22A is a push-fit. The closure insert 52A also has an axially projecting annular flange 55A near its outer circumference which is directed away from the main body portion 10A (when the insert 52A is in position in the main body portion 10A). This flange 55A has an integral annular latch formation 57A on its outer circumference, which, when the cap 15A is fully screwed down on the main body portion 10A, comes into latching engagement behind a co-operating annular abutment surface 58A formed by one side of an internal circumferential groove 59A in the interior of the cap 15A. The insert 52A is made of a suitable plastics material which is sufficiently resilient to allow the flange 55A to yield inwardly and then snap outwardly into latching engagement in the groove 59A in the manner of a bayonet catch. FIGS. 6 and 7 show the cap and closure insert interengaged in this manner.

The device illustrated in FIGS. 5 to 7 is employed in much the same way as that of FIGS. 1 to 4. Thus the device is supplied with a spacer disc 17A interposed between the spigot 30A and the closure insert 52A to locate the cap in its partially-screwed-down position. For use the cap is unscrewed, the spacer disc 17A is removed, a blood sample is introduced into the cup formation in the plug 22A, and the cap 15A is screwed down on the main body portion 10A of the vessel to trap a metered volume of blood in the space defined between the co-operating formations of the spigot and plug, as previously described. Further screwing down of the cap 15A will cause the spigot to enter the hole 20A and force the plug 22A out of the hole and into the interior of the vessel, thus releasing the metered blood sample into the diluent 23A in the vessel.

Moreover as the cap 15A is screwed down towards its limiting position in which a shoulder 60A on the cap engages the flange 53A of the closure insert, as shown in FIG. 6, the latching flange 55A will yield resiliently as it is forced into the restricted interior of the cup until it snaps into latching engagement in the groove 59A, when the engagement of the latch formation 57A behind the groove abutment 58A will latch the closure insert 57A positively to the cap 15A.

The closed vessel containing the metered blood sample can now be despached to the laboratory for subsequent analysis. When it is required to open the collection vessel for analysis, the cap can be gently unscrewed from the main body portion 10A and will slowly withdraw the closure insert 52A, which is latched to it by the connection 57A,58A, axially from the main body portion 10A thus opening the vessel to give access to its interior. The slow and gentle withdrawal of the closure insert 52A enables the vessel to be opened without any sudden shock or snap effect and avoids any risk of droplets of the liquid contents being dissipated into the surrounding atmosphere in the laboratory as a potential hazard to personnel.

The components of the device shown in FIGS. 5 to 7 may be made of various materials, but the following preferred plastics materials are given by way of example:

The main body 10A of the collection vessel: crystal polystyrene.

The screw cap 15A: high-density polyethylene.

The closure insert 52A: polypropylene, in a suitable grade to provide the required snap-latching action between the flange 55A and cap 15A.

The plug 22A: low-density polyethylene.

Instead of the spacer disc 17A, a tubular cylindrical spacer, similar to the spacer 16 in FIG. 1, could be used, being interposed between the base of the cap 15A and the closure insert 52A inside the annular latch flange 55A. This tubular spacer would be removed before use of the device.

In either of the embodiments described and illustrated it is possible to use a modified form of the plug, 22 or 22A, the modification consisting of an integral locating formation, for example a thin radially-projecting circumferential flange around the side of the plug, which will overlie the top of the neck 12 or insert 52A as the case may be to locate the plug in its initial inserted position of FIG. 1 or 5 respectively. When the cap is screwed down further, causing the spigot to force the plug downwardly towards the interior of the vessel, this locating formation on the plug breaks off to allow the plug to pass through the throat 20 or hole 20A.

We claim:

1. A collector device for receiving, metering and holding a sample of liquid of predetermined small volume, which comprises a collection vessel having an aperture leading into its interior, a plug which is a push-fit in the aperture and closes the vessel when inserted in the aperture prior to use of the device, the plug being capable of being pushed slidably through the aperture to enter the interior of the vessel, and a co-operating spigot member capable of being inserted into the aperture as a close fit therein, the opposed ends of the plug and spigot member being formed with co-operating formations shaped to define between them, when the said ends of the spigot and plug are abutted, a space of predetermined volume by which in use a sample of the liquid can be metered and temporarily trapped therein, whereby in use the spigot member can be advanced inwardly through the aperture in abutment with the plug to push the plug ahead of it and displace the plug from the aperture into the interior of the vessel so as to transfer the trapped metered liquid sample into the interior of the vessel, the spigot member when so advanced fitting closely within the aperture so as to close the vessel.

2. A collector device as claimed in claim 1 in which the opposed ends of the plug and spigot have co-operating concave and convex formations adapted, when the opposed ends are abutted together, to define between them a closed space of predetermined volume less than the volume of the concave formation whereby, when the opposed ends are brought together with the concave formation filled with liquid, excess liquid will be displaced from the concave formation by the convex formation leaving a metered volume of the liquid trapped in the space between the abutted spigot and plug.

3. A collector device as claimed in claim 2 in which the outer end of the plug is formed with an outwardly-facing cup-shaped recess, and the co-operating end of the spigot includes an axially-projecting convex portion.

4. A collector device as claimed in claim 3 in which the plug and the spigot have circumferential shoulders respectively surrounding the recess and the projecting convex portion, which shoulders form abutting surfaces respectively of the plug and spigot.

5. A collector device as claimed in claim 4 in which the axially-projecting portion of the spigot is of conical form.

6. A collector device as claimed in claim 5 in which the cup-shaped recess in the plug is of part-spherical form.

7. A collector device as claimed in any one of claims 1 to 6, which includes a screwthreaded cap which carries the spigot member and which can be screwed onto a co-operating screwthread on the collection vessel, the thread on the cap being coaxial with the spigot, and that on the vessel being coaxial with the aperture whereby the cap can be screwed down on the vessel to advance the spigot through the aperture and displace the plug into the interior of the vessel.

8. A collector device as claimed in claim 7 in which the collection vessel has a protruding neck with an elongate throat which leads into the interior of the vessel and whose outer end affords the aperture in which the plug fits, the screwthread of the vessel being formed externally on the neck coaxially with the throat so that in use the cap is screwed onto the neck of the vessel.

9. A collector device as claimed in claim 8, including a spacer adapted to be temporarily interposed between the collection vessel and the cap with the cap partially screwed onto the neck, the spacer when so interposed preventing the cap from being fully screwed down on the neck to displace the plug from the throat.

* * * * *